Nov. 29, 1960 R. E. McGAYHEY ET AL 2,962,240

TURNTABLE MECHANISM

Filed Sept. 28, 1959 4 Sheets-Sheet 1

INVENTORS
ROBERT E. McGAYHEY
JUNIUS A. TRICHE JR.
BY Carl C. Kling
ATTORNEY

Nov. 29, 1960 R. E. McGAYHEY ET AL 2,962,240

TURNTABLE MECHANISM

Filed Sept. 28, 1959 4 Sheets-Sheet 2

United States Patent Office 2,962,240

Patented Nov. 29, 1960

2,962,240

TURNTABLE MECHANISM

Robert E. McGayhey, Beacon, and Junius A. Triche, Jr., Poughkeepsie, N.Y., assignors to International Business Machines Corporation, New York, N.Y., a corporation of New York Filed Sept. 28, 1959, Ser. No. 842,804

4 Claims. (Cl. 242—55.18)

This invention relates to center-of-roll tape feed devices, and more particularly to mechanism for minimizing undesirable deviations of the tape being fed during the start-run-stop sequence.

Center-of-roll feeding of strip-type serial information devices including paper tape, magnetic tape, and photographic film, has been the subject of inventive effort for many years. The desirability of eliminating the rewind operation is obvious. Nevertheless, center-of-roll feeding has not supplanted the unwind-rewind sequence normally used, except in isolated cases and in continuous-loop devices. The problems of center-of-roll feeding are due largely to the great variations in the kinetics of a rotating reel of tape, the moments of mass of which vary as the tape is unwound, and to the additional problems introduced by the act of pulling tape out of the plane of storage. A suitably balanced turntable, which is rotated by the force pulling tape from the center-of-roll, is normally utilized to prevent the tightening of the center convolution of tape which would lock up if the roll were not rotated. However, when tapes of considerable mass are center-of-roll fed at high speeds, the turntable carrying the rotating roll builds up inertia during acceleration which tends to continue rotation of the reel. A sudden cessation of the pulling force (which occurs when the tape is halted for a Stop) often results in overrunning of the roll and tangling of the tape fed during the overrun, or at least results in slack which may cause tape breakage on the following start.

Heavy brakes can accomplish stopping of the rotating turntable and roll of tape, but such brakes are expensive. In high-speed, sudden-stop tape feeding applications, such as the use of tape as computer input, such brakes necessarily must stop the turntable simultaneously with the halting of the tape, since early stopping might result in a hold-pull situation which would break tape and since later stopping might result in a push-hold situation which would create slack and tangling. Paper tapes are especially susceptible to breakage, since the punched data holes weaken the tape and provide a tear path.

Tapes being fed from the center of a roll carried by a rotating turntable tend to develop oscillating forces which, if continued, interfere with proper feeding. Two or more concentric circular masses of tape normally form the outside circle (major mass), being the outside convolutions of the reel of tape, and the inside circle (minor mass) being the convolutions of tape which migrate against the center tape retaining rollers. In addition, one or more other circular masses (intervening masses) of tape may form in the intervening space. These masses are unstable, since tape moves into and out of them depending on the linear speed of tape in the particular mass as related to the linear speed of tape pulling and the linear speed of the inner convolution of the adjacent exterior mass of tape. In any but the outermost (major) mass of tape, there is considerable sliding of adjacent convolutions of tape, one over the other, since the mass rotates as a body, with the linear speeds of the outer convolutions being greater than the linear speeds of the inner convolutions. These sliding forces are generally predictable, but may take on harmonic vibrating characteristics which result in the oscillation of a mass of tape, which tends to increase tangling and breakage.

*Objects*

It is, therefore, an object of the invention to provide a novel turntable mechanism to feed tape from center of roll with increased efficiency and decreased susceptibility to breakage and tangling.

It is a further object of the invention to provide a novel turntable mechanism for center-of-roll feeding, which mechanism is inexpensive, removable, and efficient.

*Summary of invention*

The invention provides turntable mechanism which presents a continuing buffer between the tape actually being pulled out from the center-of-roll and the major mass of the roll of tape rotating on the turntable. An intermediate rotating minor mass of tape, which does not rotate as a body with the major mass of tape, is kept under control of minor tape mass control means intermediate the major turntable and the central retainer rollers. When the pulling force subsides, the minor mass of tape absorbs the effects of inertia by giving up a few turns of tape to the major tape mass—the minor tape mass, having small inertial effect as contrasted to the major tape mass, does not produce harmful overrun effects.

The minor tape mass control means allows an inexpensive, unbraked major turntable to be used in a center-of-roll tape feed device. The control means being itself inexpensive, the combination is economically feasible and effective for use with high-speed, sudden-stop tape manipulating devices without excessive tape breakage or tangling.

Tapes, especially paper tapes, vary greatly in mass and other physical characteristics, which in some cases requires adjustments in the center-of-roll feeding device. The minor tape mass control means affords means for a relatively unskilled operator to compensate for these characteristic variations speedily and without tools.

The foregoing and other objects, features and advantages of the invention will be apparent from the following more particular description of preferred embodiments of the invention, as illustrated in the accompanying drawings.

*Drawings*

Figure 1:
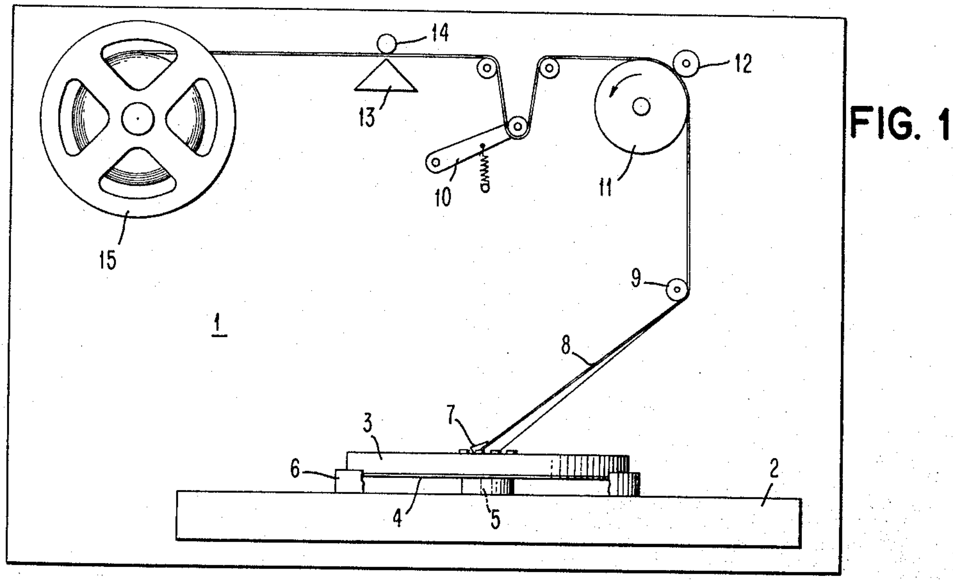
Fig. 1 is an elevation diagram of a center-of-roll feeding tape manipulating device in an environment suitable for use of the invention.

*Fig. 1.—Environment*

A tape manipulator in which the invention is most useful generally follows a pattern similar to that illustrated. A vertical plate 1 carries a horizontal shelf 2 upon which a reel of tape 3 rests on turntable 4. The turntable is journalled on shaft 5 for rotation; guard 6 prevents fingers from jamming between turntable and shelf.

A change of direction mechanism 7 allows tape 8 to be pulled out of the center-of-roll. Idler roller 9 and tensioning arm 10 keep the tape taut between roll 3 and drive capstan 11, which may be continuously rotating for continuous-speed tape pulling under control of pad roller 12. Tape is fed past head 13 and brake 14 onto reel 15. Suitable controls for capstan 11, pad roller 12 and reel 15, which often include loops, tensioning arms such as 10, and reel servos, may be included for a high-performance system in a manenr well-known in the art.

Figure 2:
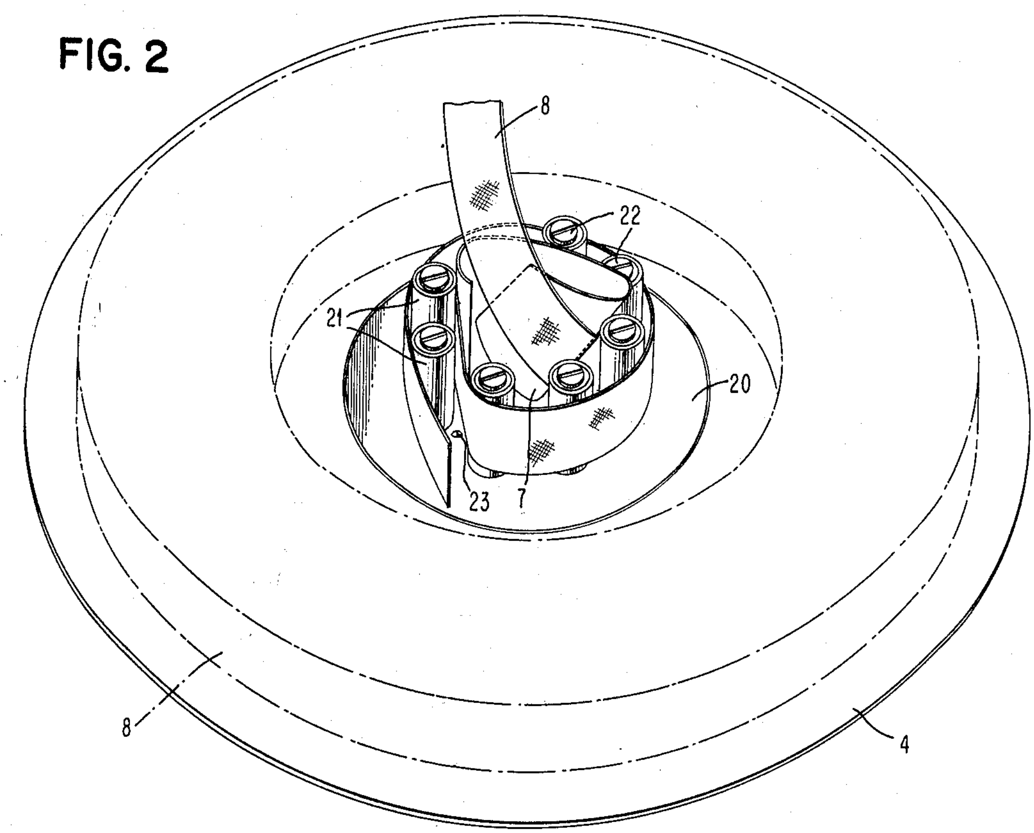
Fig. 2 is an isometric view of a major turntable and center tape retainer rollers adapted for use with a first embodiment of the invention.

*Fig. 2.—Major turntable*

This figure is largely illustrative of prior art. Major turntable 4 is mounted for rotation about a central axis by means illustrated in Fig. 5. A central platform 20 is firmly affixed to shelf 2 and does not rotate. A central convolution of tape is wound around central tape retainer rollers 21, which are journalled on studs 22 extending perpendicular to platform 20. Change-of-direction mechanism 7 comprises a frusto-conical roller rotatably mounted on platform 20. A spiral ramp or other change-of-direction means will also suffice.

Figure 3:
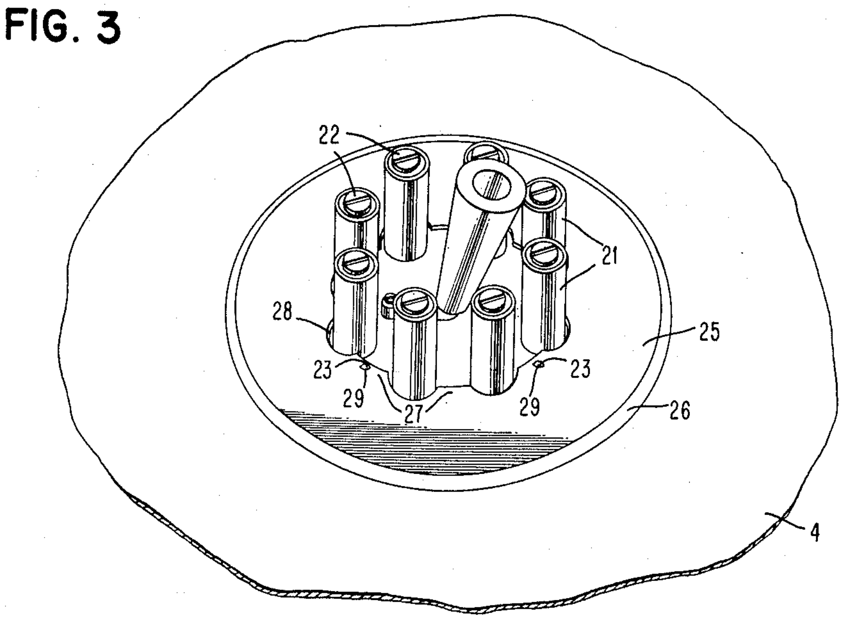
Fig. 3 is an isometric view of the major turntable of Fig. 2 equipped with a plate-type minor tape mass control means according to said first embodiment of the invention.

Platform 20 is equipped with a plurality of short studs 23 which are used to locate and position the minor tape mass control plate to be explained in conjunction with Fig. 3.

The tape 8 is shown in Fig. 2. It forms a convolution about rollers 21, and is threaded over change-of-direction mechanism 7 to drive capstan 11. As the drive capstan rotates, the linear tape movement thus produced causes the minor tape mass to form and the major turntable to turn clockwise when the friction of the minor tape mass against turntable 4 overcomes the static inertia of the turntable. During continuous rotation a stability condition is maintained with the minor tape mass and major tape mass each moving at a stable angular turntable velocity which holds the minor tape mass fairly constant while feeding tape out the center-of-roll, the major tape mass dwindling constantly. When the pulling force subsides, the inertia of the turntable and masses of tape causes continued rotation of the minor tape mass at the angular velocity of the turntable, which causes harmful overthrow of tape out of the center-of-roll.

Figure 4:
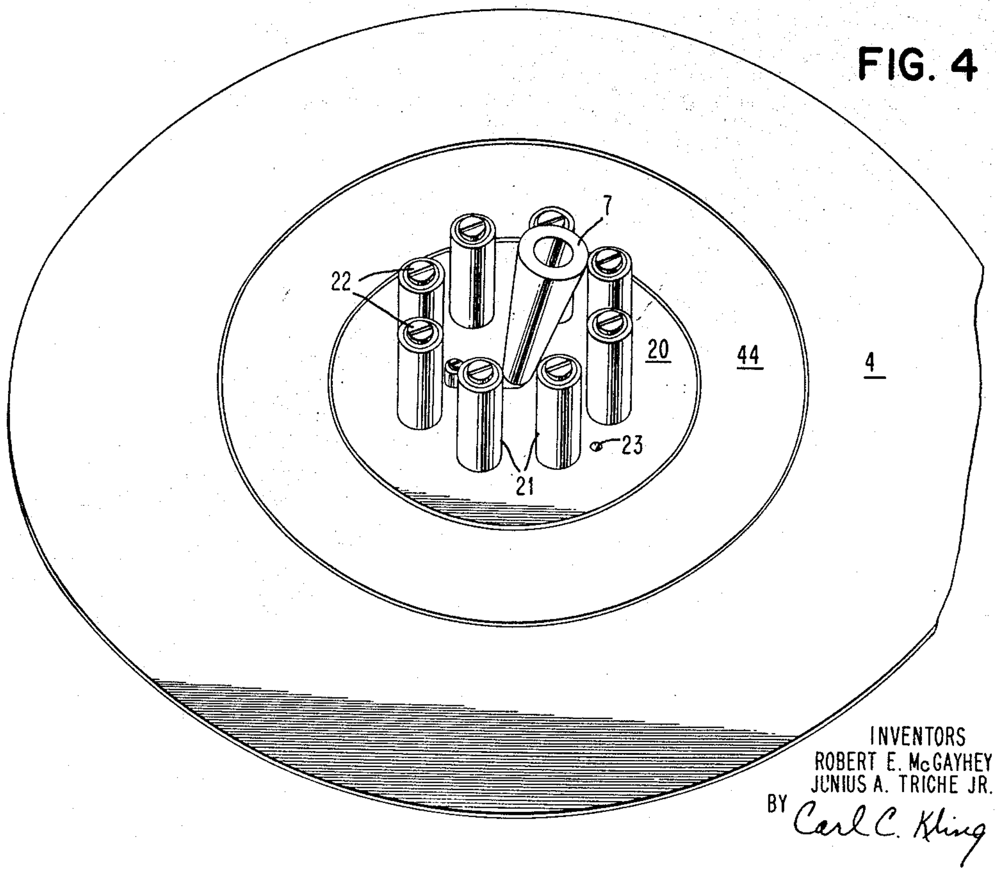
Fig. 4 is an isometric view of a second embodiment of the invention in which a turntable-type minor tape mass control means is utilized.
Figure 5:
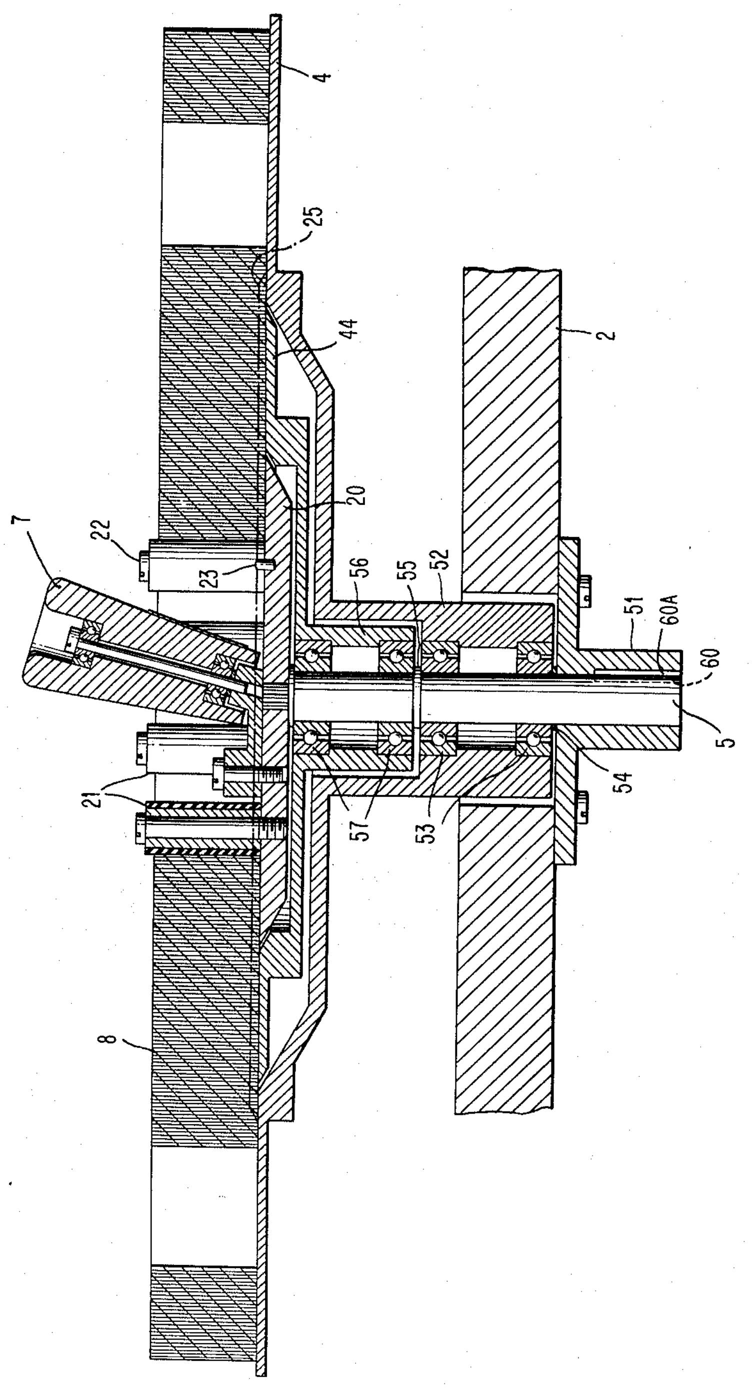
Fig. 5 is an enlarged section view of the turntable mechanism.

*Figs. 3–5.—Minor tape mass control plate*

Minor tape mass control plate 25 is positioned on studs 23 to resist rotation. It comprises a disk body 25, having a chamfered edge 26, a central essentially circular opening having a plurality of aprons 27 alternating with a plurality of recesses 28 which aprons and recesses provide a surface proximate to central tape retainer rollers 21, while allowing free rotation to the retainers. Holes 29 cooperate with studs 23 of platform 20 to establish minor tape mass control plate 25 as a nonrotating part of the center-of-roll feed device. The minor tape mass control plate 25 extends outward over a portion of major turntable 4, providing a non-rotatable slide for the minor tape mass, which slide introduces a frictional drag to prevent overrun of tape when the pulling force subsides. The slight canting of tape as it rides up chamfered edge 26 tends to loosen the tightly-packed tape as it migrates onto minor tape mass control plate 25.

Figures 6, 6A, 6B, 6C, 6D, 6E, 6F:
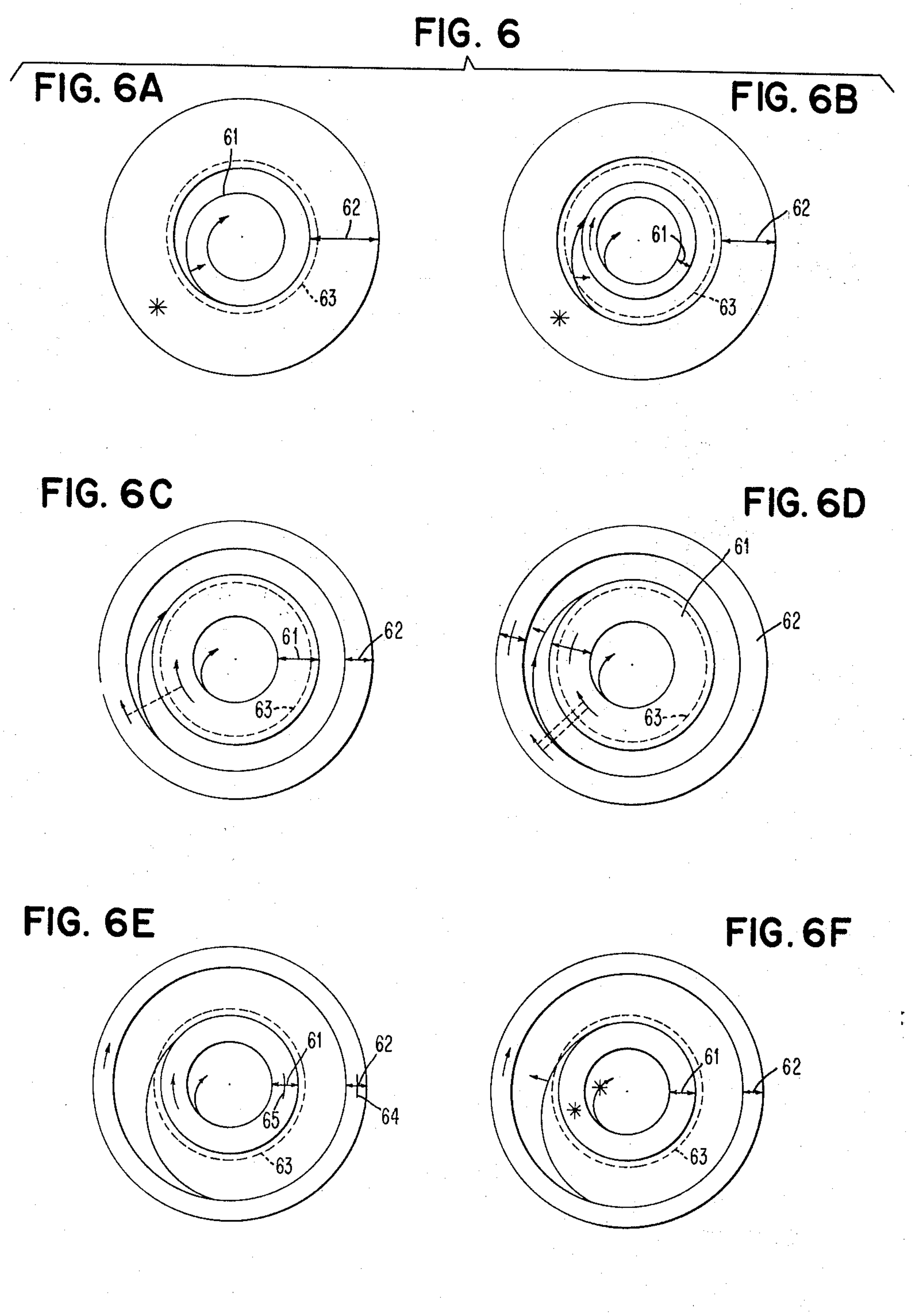
Fig. 6 is a diagram of the minor tape mass and major tape mass during tape feeding.

*Fig. 6.—Tape mass control diagram applied to minor tape mass control plate*

Tape is threaded through the change-of-direction means and a single-convolution minor tape mass 61 is formed as the operator pulls one revolution of tape taut about the central tape retainer rollers. Tape feeding commences with the roll of tape stationary on the major turntable, in closely-packed major tape mass 62 (Fig.

6A). A small portion of the total number of convolutions of tape may lie on the minor tape mass control means, the outline only of which is shown dotted in Fig. 6, referenced by numeral 63. Tape is pulled out of the center-of-roll, past the change-of-direction means, introducing linear movement to the tape, as shown by the arrowhead on the tape. The linear tape movement initially results only in a centerward migration of the tape (small arrow) forming minor tape mass 61 as the tape makes contact with the central tape retainer rollers. When centerward migration is sufficiently impeded by the minor tape mass 61, the linear tape motion produces rotation of the minor tape mass 61 (Fig. 6B) as the minor tape mass begins to slide rotationally on the minor tape mass control plate. Rotation is continuously impeded by the frictional drag of the tape on the minor tape mass control plate, but this drag is overcome by the strong pull from the drive capstan (11—Fig.1). The minor tape mass tightens about the central tape retainer rollers.

The rotating minor tape mass 61 grows until it begins to intrude onto the major turntable (Fig. 6C) whereupon the major turntable begins to rotate. Since the minor tape mass locks itself onto the major turntable, the minor and major tape masses rotate at the same angular velocity. This causes a stabilizing effect (Fig. 6D) because the relative linear tape speed of tape on the inside of the major tape mass is higher than that of tape on the outside of the minor tape mass. Tape may actually move from the minor tape mass to the major tape mass as shown by the arrow because of the effects of the simultaneous pulling of tape out of the center-of-roll, the shrinking of the minor tape mass, and the frictional drag of the minor tape mass control plate. The linearly-moving and centrally-migrating masses of tape then stabilize on the turntable at a point where the linear speed of the convolution representing the moment of mass of each mass of tape (normally slightly outboard of midway of the mass) is matched to the linear speed of pullout (Fig. 6E). All tape convolutions migrate inwardly since their linear speed is less than pullout speed; outboard convolutions rotate together due to the packing of the mass. The innermost convolution is pulled out for use.

In the stop operation, the pullout force subsides (Fig. 6E). Minor tape mass 61 halts rotation almost immediately due to frictional drag against the minor tape mass control plate upon which it rests. The major tape mass, which is carried by the freely-rotating major turntable, may coast for several revolutions with no effect other than removing a few turns from the outside of minor tape mass 61 and putting them on the inside of major tape mass 62. This effect is actually salutary since it reduces the size of the minor tape mass, making the next tape start easier.

Minor tape mass control plates to varying diameters are used with varying types of tape. Chadless 5-channel tape, for example, is very light due to loose packing caused by the flaps over holes. It does not build up much inertia and requires a large minor tape mass control plate. Chad type 8 channel tape, conversely, is tightly packed and heavy—it requires a much smaller minor tape mass control plate or none at all. Three or four minor tape mass control plates are sufficient for all normal variants of tapes for a particular machine. The minor tape mass control plates are rugged and small, presenting no storage problem. The plate as a minor tape mass control means is especially effective on paper tapes at speeds of 50 inches per second and up.

*Figs. 4, 5—Minor tape mass control turntable*

Major turntable 4 is separated from platform 20 by minor tape mass control turntable 44; the two turntables are journalled on the same shaft rotating independently about a common axis.

*Fig. 6—Tape mass control diagram*

As tape is fed from center-of-roll the minor tape mass (Fig. 6A) migrates to the central tape retaining rollers (Fig. 6B), each convolution of tape in the minor tape mass 61 sliding linearly and centerward over the minor turntable until sufficient friction is built to start the minor turntable rotating, whereupon a second mass of tape (or continuation of the minor mass) intrudes onto the major turntable from the minor turntable. This second mass finally increases in diameter sufficiently to intrude onto the major turntable, or to present a tangential pull, whereupon the major turntable starts rotating (Fig. 6C). The masses of tape then stabilize (Fig. 6D) at a point where the linear speed of a convolution 64 or 65 representing the moment of mass of each mass of tape (normally slightly outboard of midway of the mass) is matched to the linear speed of pullout.

When pullout ceases, the major mass of tape 62, because of its diameter and relative size, possesses the major portion of inertial push tending to keep tape moving. The minor mass of tape 61 possesses relatively little inertial power, which does not push tape sufficiently to product harmful overrun. The minor turntable coasts to a stop, pushing an (allowably) short length of tape past the change-of-direction means. The major turntable may continue to rotate for several revolutions with no effect other than piling a few extra turns from the outside of the minor tape mass 61 onto the inside of major tape mass 62.

*Fig. 5—Construction*

The center-of-roll turntable assembly may comprise major turntable 4, minor turntable 44, and platform 20, which are carried by shaft 5 extending perpendicular to shelf 2, as previously described in conjunction with other figures. Bracket 51 holds shaft 5, nonrotatably. Major hub 52 carries major turntable 4, and is in turn supported between combination thrust-and-rotational bearings 53. Collar 54 on bracket 51 supports the weights of the turntable assembly, which may therefore be simply removed as a unit from bracket 51 and shelf 2 when not in use. Collar 55 on shaft 5 supports the minor turntable 44 by means of hub 56 and combination bearings 57. Shaft 5 has a squared-off portion 60 which acts as a keyway to cooperate with key portion 61 of bracket 51. The rotating parts of the mechanism are of lightweight metal such as aluminum, and are further lightened by holes wherever practical.

Various combinations of the use of minor tape mass control plate 25 (shown in phantom) with major turntable 4 and minor turntable 44 may be employed for best results at different speeds or with different tapes. Similarly, the relative diameters of minor and major turntables may be varied by means of similar plates. The single basic construction of turntable is thus variable by an unskilled operator through use of the plates without the requirement of any tools whatsoever.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A minor tape mass control plate for use in conjunction with a center-of-roll tape feed device, comprising a disk body, having a chamfered exterior edge and a central essentially circular opening for providing a surface proximate to central tape retainers of the center-of-roll tape feed device while allowing operation of said retainers, and means to establish said plate as a part of the center-of-roll feed device.

2. A turntable assembly for a center-of-roll tape feed device comprising: a nonrotatable shaft, a major turntable rotatably journalled on said shaft, a minor turntable coplanar with said major turntable rotatably journalled on said shaft for movement independent of said major turntable, and a central platform nonrotatably mounted perpendicular to a terminal portion of said shaft, essentially coplanar with said turntables, for supporting central tape retainer means and change-of-direction means.

3. A turntable assembly for a center-of-roll tape feed device comprising: a nonrotatable shaft; a major hub journalled for independent rotation about said shaft; a major turntable associated with said major hub; a minor hub journalled for independent rotation about said shaft; a minor turntable associated with said minor hub; and a platform for supporting central tape retainer means and change-of-direction means, said platform being provided with means for establishing a minor tape mass control plate, said platform, minor turntable and major turntable being substantially coplanar, whereby tapes of varying characteristics may be center-of-roll fed at varying speeds without undue breakage or tangling.

4. A turntable assembly for a center-of-roll tape feed device comprising: a major turntable, journalled for rotation about an axis for bearing a rotating major mass of tape during tape feeding; a stationary platform essentially coplanar with said major turntable and centered about the axis of said major turntable, said platform bearing central tape retainer means, change-of-direction means, and minor tape mass control plate establishing means; and a minor tape mass control plate established intermediate said platform and said major turntable by said establishing means, whereby minor tape mass control according to the frictional drag of said plate upon the minor tape mass is continuously applied during tape feeding.

References Cited in the file of this patent

UNITED STATES PATENTS

| | | |
|---|---|---|
| 2,177,505 | Van der Schalie | Oct. 24, 1939 |
| 2,363,627 | Van der Schalie | Nov. 28, 1944 |
| 2,436,032 | Bendfelt | Feb. 17, 1948 |